UNITED STATES PATENT OFFICE.

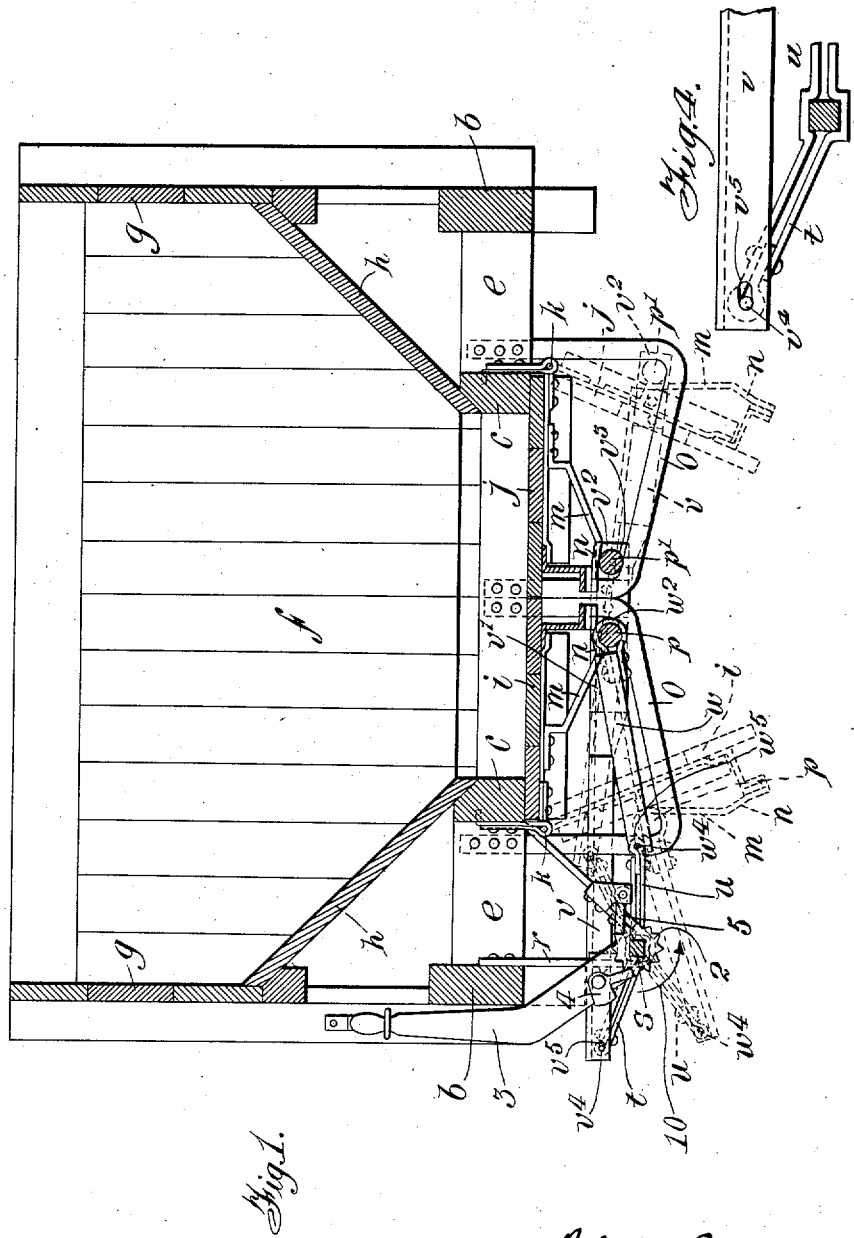

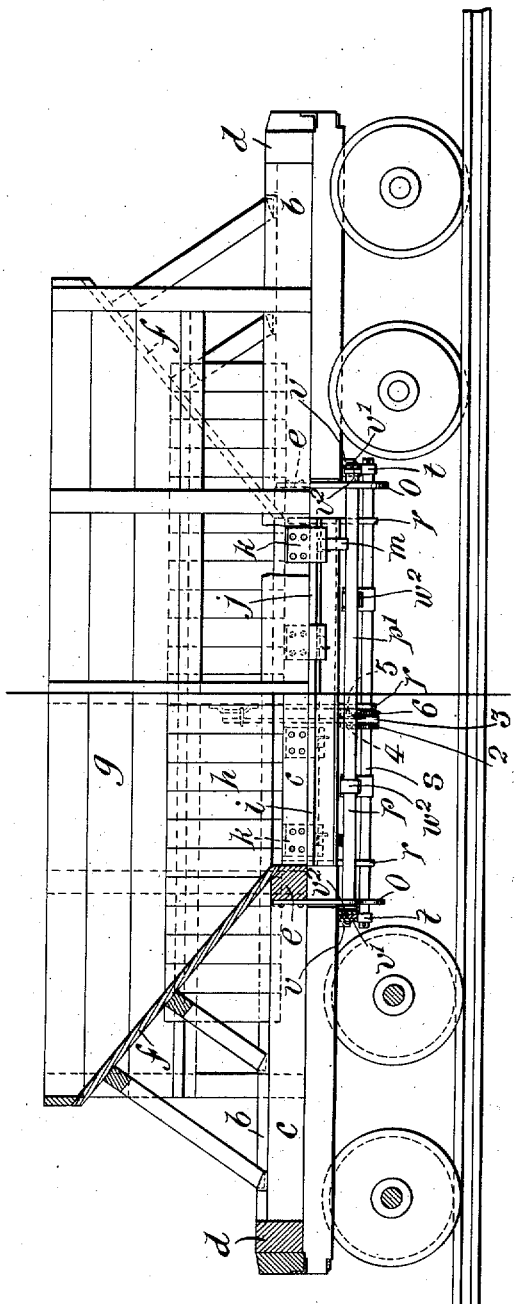

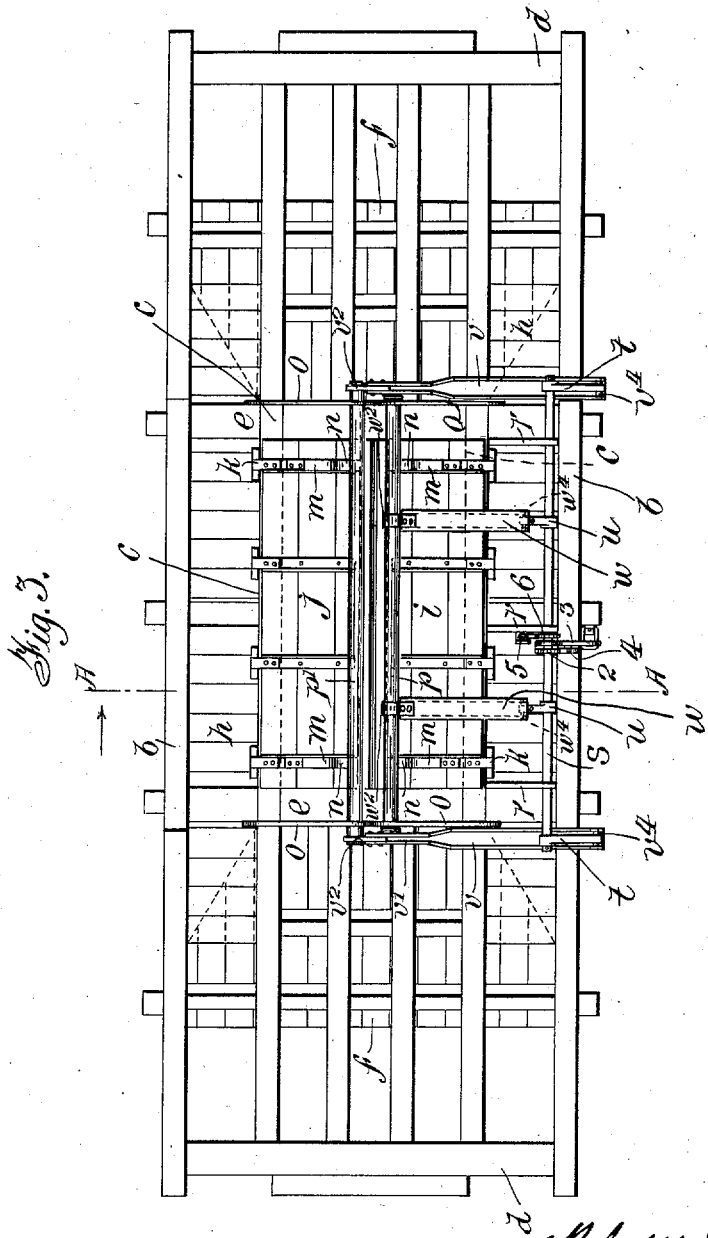

ROBERT MONTAGUE ZIMMERMAN, OF MONTREAL, QUEBEC, CANADA, ASSIGNOR TO NATIONAL DUMP CAR COMPANY, OF CHICAGO, ILLINOIS, A CORPORATION OF MAINE.

DUMP-CAR.

1,021,286.

Specification of Letters Patent. Patented Mar. 26, 1912.

Application filed June 9, 1910. Serial No. 566,090.

*To all whom it may concern:*

Be it known that I, ROBERT MONTAGUE ZIMMERMAN, of the city of Montreal, Province of Quebec, Canada, have invented certain new and useful Improvements in Dump-Cars; and I do hereby declare that the following is a full, clear, and exact description of the same.

My invention relates particularly to dump cars of the type having fixed bodies presenting a single hopper-like discharge opening and gravity discharge doors hinged to the side edges of the said opening, and the invention may be said to consist of the construction, combination, and particular arrangement of parts hereinafter described and pointed out in the claims. For full comprehension, however, of my invention reference must be had to the accompanying drawings forming a part of this specification in which similar reference characters indicate the same parts and wherein—

Figure 1 is a transverse vertical sectional view of a car constructed according to my invention, the section being taken on line A A Fig. 3. Fig. 2 is a side elevation thereof drawn to a smaller scale one end of the car being shown in longitudinal vertical sectional view; Fig. 3 is a plan view of the underside of the car; and Fig. 4 is an enlarged detail view illustrating the connection between one of the door operating parts and the door to which it is connected.

The body of the car illustrated comprises a floor frame consisting of a pair of side sills $b$ longitudinal intermediate sills $c$, end sills $d$, and intermediate transverse sills $e$. The superstructure carried by this floor frame comprises inclined end hopper walls $f$ and side walls consisting of vertical and inclined portions $g$ and $h$ respectively, the transverse and longitudinal intermediate sills $e$ and $c$ having the hopper walls fastened thereto and forming the frame of the discharge opening of the car.

The doors, $i$ and $j$, are hinged as at $k$ to the sills $c$ $c$ forming the sides of the discharge opening and are provided on their undersides with rails extending inwardly of the doors from points near the free sides thereof and each presenting tread surfaces $m$ $n$, the former ($m$) inclining upwardly toward the hinged sides of the doors, and the latter ($n$) inclining upwardly toward the free sides thereof, and when the doors are in closed position converge slightly toward the supporting rails $o$ suspended from the floor framing, the rails $o$ inclining upwardly toward the center of the car.

The doors are operated by laterally movable shafts $p$ $p'$ supported on the rails $o$, in conjunction with such rails, the rails on the underside of the doors, and unitary gear operatively connected to both doors and comprising the following mechanism. A series of bearing straps $r$ suspended from the side and intermediate transverse sills $b$ and $c$ respectively, support an oscillatory shaft $s$ having mounted rigidly thereon two pairs of crank arms $t$ $t$ and $u$ $u$, respectively, equally spaced from the ends of the shaft with the arms $t$ $t$ near the ends. These arms $t$ $t$ are connected to the shafts $p'$ by pitmen $v$ extending past the ends of the door $i$ outside of the vertical planes of both doors, and the arms $u$ are connected to the shaft $p$ by shorter pitmen $w$ extending beneath the door $i$.

For simplicity in building and to provide for ready repairs in the event of the renewal of some of these parts being necessitated, the pitmen $w$ are constructed of plates $w'$ bent to channel form and having clevises $w^2$ riveted to one end thereof and through which shaft $p$ passes, the pitmen $v$ consisting of plates also bent to channel form but of irregular configuration presenting one end $v'$ of less width than the other, the narrow end having riveted thereto a plate $v^2$ with a hole $v^3$ through which shaft $p'$ passes.

The arms $u$ and $t$ are connected to the opposite ends of these pitmen by means of pins $w^4$ and $v^4$ and holes $w^5$ in the pitmen $w$ and slots $v^5$ in the pitmen $v$. The object of this slot and pin connection is to permit the operator to start one door before the other, thereby facilitating the closing action. The particular configuration of the pitmen $v$ is to accommodate the ends of the shaft $p$ during operation, and permit of a larger discharge opening for a given length of car, while the slots in the pitmen permit the door $j$, operated thereby to follow the door 1 to closed position.

The shaft $s$ is rotated by a ratchet wheel 2 mounted rigidly thereon and a lever 3 fulcrumed on such shaft and carrying a weighted pawl engaging the ratchet wheel, while a detent pawl 5, engaging a second ratchet wheel 6 upon the shaft s locks it against retrogression.

Operation: The doors are illustrated closed and the members of the operating gear in position retaining them closed, and, in dotted lines, open. To move the doors from open to closed position, the ratchet and pawl mechanism is operated in a manner to rotate the shaft in the direction of arrow 10 thereby swinging the arms t and u to the positions shown in full lines and pushing the shaft p under compressive force exerted in the pitman w and pulling the shaft p' under tensional force exerted in pitman v until both shafts are stalled by the doors coming into tight contact with the frame of the discharge opening. In the commencement of the operation of closing or opening the doors, the door i, as before mentioned, leads the door j but catches up to it and finishes its movement to either extreme position simultaneously therewith.

What I claim is as follows:—

1. In a car having a discharge opening, the combination with a pair of doors controlling the said discharge opening, of a pair of oscillatory members movable on a common axis, means whereby the said members are oscillated, reciprocatory members operated by the said oscillatory members, and means operatively connecting the said reciprocatory members to the doors, including a pair of laterally movable shafts, a plurality of rails supporting the shafts, and a plurality of rails carried by the doors and inclined thereto and adapted to be engaged by the said shafts.

2. In a car having a discharge opening, the combination with a pair of doors controlling the said discharge opening, of a pair of oscillatory members, means whereby the said members are oscillated, reciprocatory members operated by the said oscillatory members, and means operatively connecting the said reciprocatory members to the doors, including a pair of laterally movable shafts, a plurality of inclined rails supporting the shafts, and a plurality of rails carried by the doors and each having a pair or rail surfaces inclining in opposite directions toward the doors and adapted to be successively engaged by the said reciprocatory members, for the purpose set forth.

3. In a car having a discharge opening, the combination with a pair of doors controlling the said discharge opening and adapted to open away from each other, of operating mechanism for such doors, including a pair of laterally reciprocating shafts, a plurality of rails supporting each of the shafts, and a plurality of rails carried by the doors and inclined thereto and adapted to be engaged by the said shafts.

4. In a car having a discharge opening in its bottom, the combination with a pair of doors hinged at the side edges of the said opening and having their free edges meeting when the doors are closed, of an oscillatory shaft at one side of the opening; bearing plates supporting the said shaft; inclined shaft supporting rails located below the level of the doors; inclined rails upon the underside of the doors; a pair of laterally movable shafts resting upon the said supporting rails and having the rails upon the doors bearing thereon; two pairs of arms carried by the oscillatory shaft; pitmen of different lengths pivotally connected at their opposite ends to the said arms and laterally movable shafts; and means for oscillating the said oscillatory shaft.

5. A car comprising side sills, end sills, intermediate longitudinal and transverse sills forming a frame, hopper walls supported with their lower edges connected to the frame, a pair of doors hinged to the said longitudinal intermediate sills and having their free edges meeting when the doors are closed, of an oscillatory longitudinal shaft at one side of the said frame; bearing plates suspended from the transverse sills and supporting the said shaft; inclined shaft supporting rails suspended from the sills and located below the level of the doors; inclined rails upon the underside of the doors; a pair of laterally movable shafts resting upon the said supporting rails and having the rails upon the doors bearing thereon; two pairs of arms carried by the oscillatory shaft; pitmen of different lengths pivotally connected at their opposite ends to the said arms and laterally movable shafts; and means for oscillating the said oscillatory shaft.

6. In a car having a discharge opening in its bottom, the combination with a pair of doors hinged at the side edges of the said opening and having their free edges meeting when the doors are closed, of an oscillatory shaft at one side of the opening; bearing plates supporting the said shaft; inclined shaft supporting rails located below the level of the doors; inclined rails upon the underside of the doors; a pair of laterally movable shafts resting upon the said supporting rails and having the rails upon the doors bearing thereon; two pairs of arms carried by the oscillatory shaft; pitmen of different lengths pivotally connected at their opposite ends to the said arms and laterally movable shafts and the pivotal connection between one of the doors and its pitman being slidable; and means for oscillating the said oscillatory shaft.

7. In a car having a discharge opening in its bottom, the combination with a pair of doors hinged at the side edges of the said opening and having their free edges meeting when the doors are closed, of an oscillatory shaft at one side of the opening; bearing plates supporting the said shaft; inclined shaft supporting rails located below the level of the doors; inclined rails upon the underside of the doors; a pair of laterally movable shafts resting upon the said supporting rails and having the rails upon the doors bearing thereon; two pairs of arms carried by the oscillatory shaft; pitmen of different lengths pivotally connected at their opposite ends to the said arms and laterally movable shafts and the pivotal connection between one of the doors and its pitman including a slot; and means for oscillating the said oscillatory shaft.

In testimony whereof, I have signed my name to this specification, in the presence of two subscribing witnesses.

ROBERT MONTAGUE ZIMMERMAN.

Witnesses:
STANLEY C. KING,
JOHN A. O'KEEFE.